(12) United States Patent
Young et al.

(10) Patent No.: US 12,318,918 B2
(45) Date of Patent: Jun. 3, 2025

(54) FLEXIBLE VACUUM ASSEMBLY FIXTURE

(71) Applicant: Raytheon Company, Waltham, MA (US)

(72) Inventors: Judith E. Young, Tucson, AZ (US); Brent Carper, Tucson, AZ (US); Ronnie Williams, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 768 days.

(21) Appl. No.: 17/549,255

(22) Filed: Dec. 13, 2021

(65) Prior Publication Data

US 2023/0182323 A1 Jun. 15, 2023

(51) Int. Cl.
*B25J 15/00* (2006.01)
*B25J 15/06* (2006.01)
*B25J 18/06* (2006.01)

(52) U.S. Cl.
CPC ....... *B25J 15/0683* (2013.01); *B25J 15/0052* (2013.01); *B25J 18/06* (2013.01)

(58) Field of Classification Search
CPC .... B25J 15/0683; B25J 15/0052; B25J 18/06; B25J 15/0691
USPC ................................................ 294/64.3, 183
See application file for complete search history.

(56) References Cited

U.S. PATENT DOCUMENTS

| | | | |
|---|---|---|---|
| 4,183,511 A | 1/1980 | Marek | |
| 5,782,638 A * | 7/1998 | Warren, III | A44C 15/007 433/206 |
| 6,439,631 B1 * | 8/2002 | Kress | B65G 47/918 414/754 |
| 6,722,842 B1 | 4/2004 | Sawdon et al. | |
| 6,827,344 B1 | 12/2004 | Ristau | |
| 7,000,311 B1 | 2/2006 | Reimann | |
| 7,261,350 B2 * | 8/2007 | Isetani | B25J 15/0616 294/185 |
| 8,267,367 B2 * | 9/2012 | Cho | B25J 15/0616 294/185 |
| 9,402,608 B2 * | 8/2016 | Green, II | A61M 1/80 |
| 9,803,680 B2 | 10/2017 | Pötters et al. | |
| 10,668,630 B2 * | 6/2020 | Robinson | B25J 15/0052 |
| 11,383,392 B2 * | 7/2022 | Lorenz | B25J 15/0616 |
| 11,478,942 B1 * | 10/2022 | Lee | B25J 18/025 |
| 2005/0010197 A1 | 1/2005 | Lau et al. | |
| 2007/0007733 A1 | 1/2007 | Hogarth et al. | |

(Continued)

FOREIGN PATENT DOCUMENTS

| | | |
|---|---|---|
| CN | 103567919 A | 2/2014 |
| CN | 113210961 A | 8/2021 |

(Continued)

OTHER PUBLICATIONS

International Search Report and Written Opinion dated Mar. 22, 2023 issued in counterpart Application No. PCT/US2022/052521.

*Primary Examiner* — Paul T Chin
(74) *Attorney, Agent, or Firm* — Bachman & LaPointe, P.C.

(57) ABSTRACT

A flexible vacuum assembly fixture including a base; at least one arm coupled to the base; a suction cup fitting coupled to the at least one arm distal from the base; a vacuum generator fluidly coupled to the suction cup fitting via a vacuum tube; and a grounding feature configured to electrically ground the suction cup fitting, the at least one arm, and the base.

18 Claims, 1 Drawing Sheet

(56) References Cited

U.S. PATENT DOCUMENTS

2009/0028681 A1    1/2009    Huang
2013/0048818 A1    2/2013    Von Pechmann et al.

FOREIGN PATENT DOCUMENTS

| | | |
|---|---|---|
| EP | 0431104 A1 | 6/1991 |
| WO | 9014753 A1 | 11/1990 |
| WO | 01/17437 A2 | 3/2001 |
| WO | 2011002202 A2 | 1/2011 |
| WO | 2015/019210 A1 | 2/2015 |

* cited by examiner

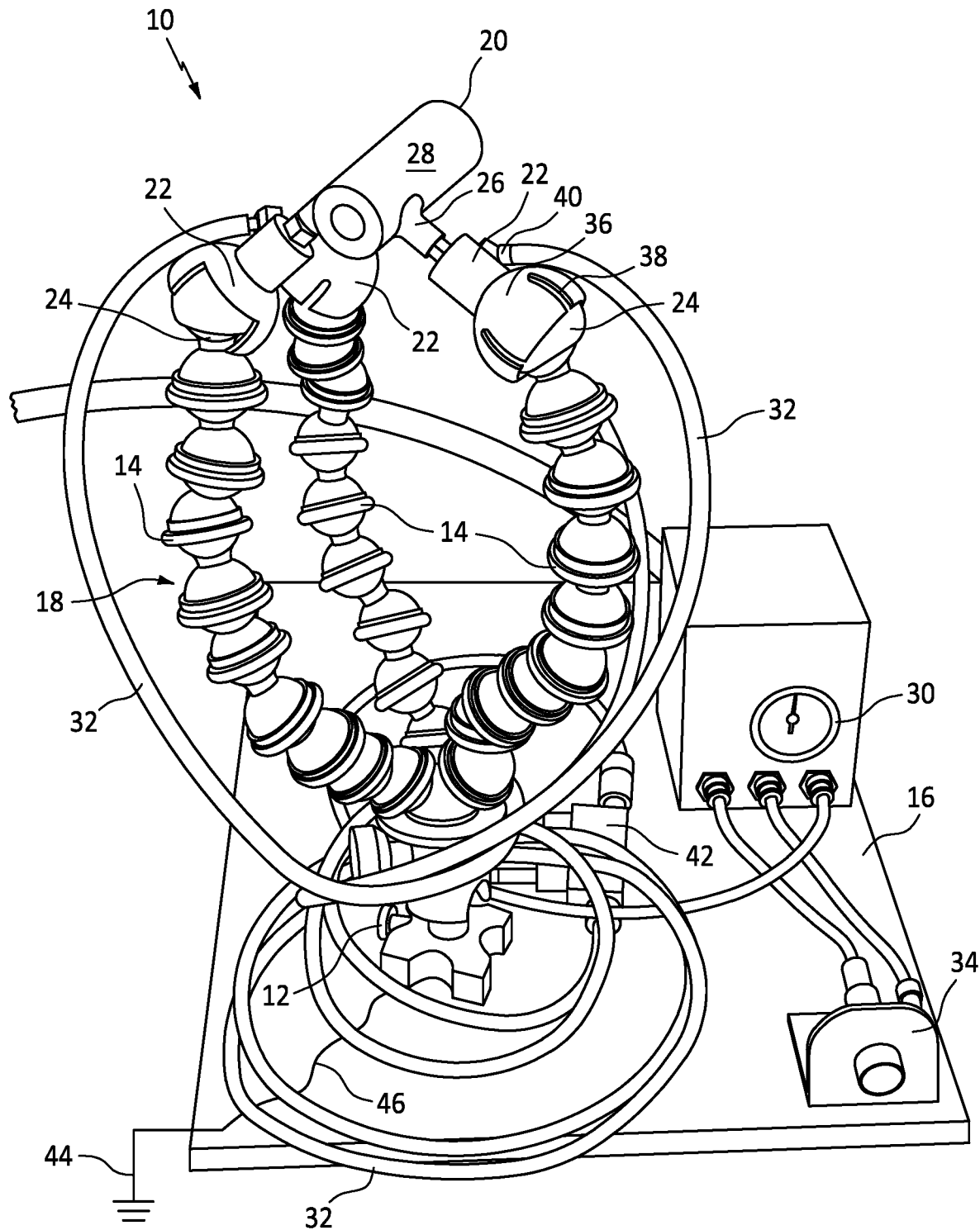

FLEXIBLE VACUUM ASSEMBLY FIXTURE

BACKGROUND

The present disclosure is directed to a device configured to support complex components during assembly, particularly, a device that is flexible which can adjust to a variety of part profiles.

Complex shaped components and assemblies are required to be held in a fixed position during assembly and part processing. These items can be difficult to secure due to the particular shapes and structures. Traditionally, custom part specific tooling and fixtures have been designed and fashioned to properly secure the components. However, custom tooling and custom fixtures can be expensive and require time for design, fabrication and proof of concept.

What is needed is a support structure configured to support complex shaped components during assembly.

SUMMARY

In accordance with the present disclosure, there is provided a flexible vacuum assembly fixture comprising a base; at least one arm coupled to the base; a suction cup fitting coupled to the at least one arm distal from the base; a vacuum generator fluidly coupled to the suction cup fitting via a vacuum tube; and a grounding feature configured to electrically ground the suction cup fitting, the at least one arm, and the base.

A further embodiment of any of the foregoing embodiments may additionally and/or alternatively include the at least one arm comprises an assembly of multiple ball and socket parts that couple in series.

A further embodiment of any of the foregoing embodiments may additionally and/or alternatively include the assembly of multiple ball and socket parts are configured to pivot by use of a ball inserted into a mating socket of each of the consecutive multiple ball and socket parts in series.

A further embodiment of any of the foregoing embodiments may additionally and/or alternatively include the arm comprises a length and a weight bearing capacity configured scalable responsive to a size, a weight, and a shape of a component being supported thereby.

A further embodiment of any of the foregoing embodiments may additionally and/or alternatively include the flexible vacuum assembly fixture further comprising a platform coupled to the base, where the platform is configured as a rigid structure to support the base.

A further embodiment of any of the foregoing embodiments may additionally and/or alternatively include the suction cup fitting comprises non-marring tacky properties configured for contact support of a component exterior surface.

A further embodiment of any of the foregoing embodiments may additionally and/or alternatively include the suction cup fitting is configured at least one of scalable, removable and interchangeable responsive to at least one of a weight, a size, and a shape of a component.

In accordance with the present disclosure, there is provided a flexible vacuum assembly fixture comprising a base coupled to a platform; at least one arm coupled to the base; a suction cup fitting coupled to the at least one arm distal from the base; a vacuum generator mounted to the platform, the vacuum generator fluidly coupled to the suction cup fitting via a vacuum tube; and a grounding feature configured to electrically ground the suction cup fitting, the at least one arm, the base and the platform.

A further embodiment of any of the foregoing embodiments may additionally and/or alternatively include the suction cup fitting is configured to produce a vacuum tight coupling to a component exterior surface.

A further embodiment of any of the foregoing embodiments may additionally and/or alternatively include the arm comprises a length and a weight bearing capacity configured scalable responsive to a size, a weight, and a shape of a component being supported thereby.

A further embodiment of any of the foregoing embodiments may additionally and/or alternatively include the suction cup fitting comprises non-marring tacky properties configured for contact support of a component exterior surface.

A further embodiment of any of the foregoing embodiments may additionally and/or alternatively include the flexible vacuum assembly fixture further comprising a vacuum demand switch fluidly coupled to the vacuum generator.

A further embodiment of any of the foregoing embodiments may additionally and/or alternatively include the suction cup fitting is configured at least one of scalable, removable and interchangeable responsive to at least one of a weight, a size, and a shape of a component.

In accordance with the present disclosure, there is provided a process for supporting a component with a flexible vacuum assembly fixture comprising coupling a base to a platform; coupling at least one arm to the base; coupling a suction cup fitting the at least one arm distal from the base; mounting a vacuum generator to the platform, fluidly coupling the vacuum generator to the suction cup fitting via a vacuum tube; and electrically grounding a grounding feature to the suction cup fitting, the at least one arm, the base and the platform.

A further embodiment of any of the foregoing embodiments may additionally and/or alternatively include the process further comprising producing a vacuum tight coupling to an exterior surface of a component with the suction cup fitting.

A further embodiment of any of the foregoing embodiments may additionally and/or alternatively include the suction cup fitting is configured at least one of scalable, removable and interchangeable responsive to at least one of a weight, a size, and a shape of a component.

A further embodiment of any of the foregoing embodiments may additionally and/or alternatively include the suction cup fitting comprises non-marring tacky properties configured for contact support of a component exterior surface.

A further embodiment of any of the foregoing embodiments may additionally and/or alternatively include the process further comprising fluidly coupling a vacuum demand switch to the vacuum generator.

A further embodiment of any of the foregoing embodiments may additionally and/or alternatively include the at least one arm comprises an assembly of multiple ball and socket parts that couple in series.

A further embodiment of any of the foregoing embodiments may additionally and/or alternatively include the assembly of multiple ball and socket parts are configured to pivot by use of a ball inserted into a mating socket of each of the consecutive multiple ball and socket parts in series.

Other details of the flexible vacuum assembly fixture are set forth in the following detailed description and the accompanying drawings wherein like reference numerals depict like elements.

BRIEF DESCRIPTION OF THE DRAWINGS

The FIGURE is a schematic of an exemplary flexible vacuum assembly fixture.

DETAILED DESCRIPTION

Referring now to the FIGURE, there is illustrated a flexible vacuum assembly fixture 10. A base 12 supports at least one arm 14. The base 12 can be configured to adjust in multiple axes. The base 12 can be set into a variety of orientations. The base 12 couples to a platform 16. The platform 16 is configured as a rigid structure to support the base 12.

The fixture 10 shown in the FIGURE has a set of three arms 14. It is contemplated that different numbers of arms 14 can be utilized. The arm 14 can be an assembly of multiple ball and socket parts 18 that couple in series. The multiple ball and socket parts 18 can pivot by use of a ball inserted into a mating socket of each of the consecutive part in series. The ball and socket parts 18 can include a predetermined friction/resistance enabling the parts 18 to be manipulated with respect to each other, while providing sufficient rigidity to remain motionless to support the component 20. The arm 14 length and weight bearing capacity can be configured scalable depending on the size, weight, and shape of the component 20 being supported. The arms 14 can be varied in length, thickness, ball and socket resistance, and the like.

A suction cup fitting 22 can be attached to the arm 14 at a distal end 24 having a location distal from the base 12. The suction cup fitting 22 can be configured to produce a vacuum tight coupling to the component 20 exterior surface 28 via a suction cup 26. The suction cup 26 can removably adhere the suction cup fitting 22 to the exterior surface 28. The suction cup fitting 22 can also include non-marring, tacky materials or adhesive properties to enable sufficient contact support of the component 20 exterior surface 28. Suction cup fitting 22 can be enabled by use of a vacuum generator (vacuum pump) 30 in fluid communication with the suction cup fitting 22 via vacuum tubes 32. The arms 14 can be manipulated as needed for the desired location and orientation of the component 20 either before or after a vacuum tight coupling is established between the component 20 and the suction cup 26.

A vacuum demand switch 34 can be fluidly coupled to the vacuum generator 30 to support sufficient vacuum suction. The suction cup fitting 22 can include a body 36 having a receiver socket 38 configured to attach to a corresponding ball of the distal end 24. The body 36 also include a vacuum line receiver 40 configured to attach to the vacuum tube 32. The suction cup 26 is connected to the body 36 opposite the receiver socket 38. The suction cup 26 extends from the body 36 and is in fluid communication with the receiver 40.

A manifold 42 can be utilized to distribute the vacuum tubes 32. The suction cup fitting 22 can be scaled in size. The suction cup fitting 22 can be scalable, removable and interchangeable to allow for multiple sizes to accommodate the multiple weight, size, shape of the component 20.

A grounding feature 44 can be electrically coupled to the suction cup fitting 22 in order to protect against electrostatic discharge for the component 20 sensitive to such hazards. The grounding feature 44 can be electrically coupled through the conductive properties of the suction cup fitting 22, arm 14, base 12, vacuum tube 32 and platform 16 ultimately to ground as shown. In an exemplary embodiment conductive wire or cable 46 can be deployed.

A technical advantage of the disclosed flexible vacuum assembly fixture includes the capacity to tailor a fixture for multiple non-common geometry.

Another technical advantage of the disclosed flexible vacuum assembly fixture includes the capacity to attach to a component via vacuum suction.

Another technical advantage of the disclosed flexible vacuum assembly fixture includes the flexibility of an articulating base providing multiple degrees of freedom movement.

Another technical advantage of the disclosed flexible vacuum assembly fixture includes multiple articulating arms to capture and support the component.

Another technical advantage of the disclosed flexible vacuum assembly fixture includes a scalable device adaptable for a wide variety of component size, weight, and geometry.

Another technical advantage of the disclosed flexible vacuum assembly fixture includes a path to ground feature enabling electrostatic discharge protection.

Another technical advantage of the disclosed flexible vacuum assembly fixture includes non-marring suction cup design to protect the surfaces of the component.

There has been provided a flexible vacuum assembly fixture. While the flexible vacuum assembly fixture has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A flexible vacuum assembly fixture comprising:
   a base;
   at least one arm coupled to said base, wherein said at least one arm comprises an assembly of multiple ball and socket parts that couple in series;
   a suction cup fitting coupled to said at least one arm distal from said base;
   a vacuum generator fluidly coupled to said suction cup fitting via a vacuum tube; and
   a grounding feature configured to electrically ground the suction cup fitting, the at least one arm, and the base.

2. The flexible vacuum assembly fixture according to claim 1, wherein said assembly of multiple ball and socket parts are configured to pivot by use of a ball inserted into a mating socket of each of the consecutive multiple ball and socket parts in series.

3. The flexible vacuum assembly fixture according to claim 1, wherein said arm comprises a length and a weight bearing capacity configured scalable responsive to a size, a weight, and a shape of a component being supported thereby.

4. The flexible vacuum assembly fixture according to claim 1, further comprising a platform coupled to said base, where said platform is configured as a rigid structure to support the base.

5. The flexible vacuum assembly fixture according to claim 1, wherein said suction cup fitting comprises non-marring tacky properties configured for contact support of a component exterior surface.

6. The flexible vacuum assembly fixture according to claim 1, wherein said suction cup fitting is configured at least one of scalable, removable and interchangeable responsive to at least one of a weight, a size, and a shape of a component.

7. A flexible vacuum assembly fixture comprising:
   a base coupled to a platform;

at least one arm coupled to said base, wherein said at least one arm comprises an assembly of multiple ball and socket parts that couple in series, said assembly of multiple ball and socket parts are configured to pivot by use of a ball inserted into a mating socket of each of the consecutive multiple ball and socket parts in series;

a suction cup fitting coupled to said at least one arm distal from said base;

a vacuum generator mounted to said platform, said vacuum generator fluidly coupled to said suction cup fitting via a vacuum tube; and a grounding feature configured to electrically ground the suction cup fitting, the at least one arm, the base and the platform.

8. The flexible vacuum assembly fixture according to claim 7, wherein said suction cup fitting is configured to produce a vacuum tight coupling to a component exterior surface.

9. The flexible vacuum assembly fixture according to claim 8, wherein said arm comprises a length and a weight bearing capacity configured scalable responsive to a size, a weight, and a shape of a component being supported thereby.

10. The flexible vacuum assembly fixture according to claim 8, wherein said suction cup fitting comprises non-marring tacky properties configured for contact support of a component exterior surface.

11. The flexible vacuum assembly fixture according to claim 8, further comprising:
   a vacuum demand switch fluidly coupled to the vacuum generator.

12. The flexible vacuum assembly fixture according to claim 8, wherein said suction cup fitting is configured at least one of scalable, removable and interchangeable responsive to at least one of a weight, a size, and a shape of a component.

13. A process for supporting a component with a flexible vacuum assembly fixture comprising:
   coupling a base to a platform;
   coupling at least one arm to said base, wherein said at least one arm comprises an assembly of multiple ball and socket parts that couple in series;
   coupling a suction cup fitting said at least one arm distal from said base;
   mounting a vacuum generator to said platform, fluidly coupling said vacuum generator to said suction cup fitting via a vacuum tube; and
   electrically grounding a grounding feature to the suction cup fitting, the at least one arm, the base and the platform.

14. The process of claim 13, further comprising:
   producing a vacuum tight coupling to an exterior surface of a component with said suction cup fitting.

15. The process of claim 14, further comprising:
   manipulating the at least one arm to move the component to a desired position and orientation.

16. The process of claim 13, wherein said suction cup fitting is configured at least one of scalable, removable and interchangeable responsive to at least one of a weight, a size, and a shape of a component.

17. The process of claim 13, wherein said suction cup fitting comprises non-marring tacky properties configured for contact support of a component exterior surface.

18. The process of claim 13, further comprising:
   fluidly coupling a vacuum demand switch to the vacuum generator.

* * * * *